United States Patent [19]
Schultz

[11] Patent Number: 5,422,480
[45] Date of Patent: Jun. 6, 1995

[54] METHOD AND APPARATUS FOR THE VERIFICATION OF HELIUM-3 PROPORTIONAL COUNTERS

[75] Inventor: Ward E. Schultz, Fulshear, Tex.

[73] Assignee: Halliburton Company, Houston, Tex.

[21] Appl. No.: 176,736

[22] Filed: Jan. 3, 1994

[51] Int. Cl.$^6$ .................. G01V 5/10; G01T 3/00; H01J 47/12
[52] U.S. Cl. .................. 250/252.1; 250/269.4; 250/374; 250/261
[58] Field of Search .................. 250/269.4, 252.1 R, 250/374, 261, 391, 390.01

[56] References Cited

U.S. PATENT DOCUMENTS

| | | | |
|---|---|---|---|
| 3,102,198 | 8/1963 | Bonner | 376/153 |
| 3,240,971 | 3/1966 | Morgan | 376/153 |
| 3,976,878 | 8/1976 | Chevalier et al. | 250/253 |
| 5,180,917 | 1/1993 | Wraight | 250/374 |

FOREIGN PATENT DOCUMENTS

| | | | |
|---|---|---|---|
| 375069 | 5/1923 | Germany | 250/252.1 R |
| 53-144390 | 12/1978 | Japan | 250/252.1 R |

OTHER PUBLICATIONS

A. Chastel, M. B. Davis, C. M. Hoffman, M. N. Kreisler and A. J. S. Smith, "A Convenient Calibration Technique for Neutron Detectors." *Nuclear Instruments and Methods*, vol. 94 (1971) pp. 493–496 ©North-Holland Publishing Co.

F. Glesius and T. Kniss, "He$^3$ Neutron Detectors for Hostile Environments," *IEEE Transactions on Nuclear Science*, vol. 35, No. 1 (Feb. 1988) pp. 867–871.

P. Wraight, E. Robinson, R. de Fleurieu, "Opportunities To Reduce Risks Associated with Nuclear Logging Techniques," SPE 23263 (Nov. 10, 1991) pp. 547–552.

T. Jeter, M. Kennison, "Recent Improvements in Helium-3 Solid State Neutron Detectors," *IEEE Transactions on Nuclear Science*, vol. NS-14, No. 1 (Feb. 1967) pp. 422–427.

G. Knoll, *Radiation Detection and Measurement*, John Wiley & Sons, Inc., 1979, pp. 532–535, 730–733.

Product Bulletin—Proportional Counters, Texlium He-3 Neutron Detectors, Texas Nuclear, a subsidiary of Ramsey Engineering, publication date unknown.

*Primary Examiner*—Constantine Hannaher
*Attorney, Agent, or Firm*—Eugene R. Montalvo

[57] ABSTRACT

A method and apparatus for verifying operation and achieving gain stabilization in a helium-3 proportional counter radiation detector utilized in nuclear logging operations. The detector includes a beta-minus particle source selected to provide a predetermined number of radiation counts for a specified time period to verify detector operation. The beta-minus source is further utilized to achieve detector gain stabilization by defining two energy windows on either side of the characteristic beta-minus energy peak. The difference in counts for the two energy windows is used to define an error signal which is applied to negative feedback loop in the detector electronics. The beta-minus source is preferably selected such that the type of source and activity is exempt from Nuclear Regulatory Commission licensing and safety requirements.

21 Claims, 4 Drawing Sheets

METHOD AND APPARATUS FOR THE VERIFICATION OF HELIUM-3 PROPORTIONAL COUNTERS

BACKGROUND OF INVENTION

1. Field of the Invention

The present invention is related to the field of formation logging, more particularly, to the verification and calibration of helium-3 ($^3$He) proportional counter detectors utilized in nuclear logging.

2. State of the Related Art

Nuclear logging techniques are well known and widely utilized by oilfield service companies to provide information necessary for oil and gas exploration and production decisions. Wireline nuclear logging techniques typically call for a logging sonde, having a neutron source and at least one neutron detector, to be lowered on an armored multi-conductor cable into a well borehole. The neutron source provides a source of high energy neutrons and may consist of an isotopic source, such as americium$^{241}$-beryllium, or neutron accelerator source. The formation of interest is irradiated by the high energy neutrons, which undergo collisions with the nuclei of naturally occurring formation materials. As a result of these collisions, the high energy neutrons lose some of their energy. The amount of energy lost by the high energy neutrons is inversely proportional to the size of the nucleus of the atom with which it collides. The collisions are generally elastic. Collisions with heavy nuclei result in relatively little energy loss; whereas collisions with a nuclei of approximately the same atomic weight, primarily hydrogen nuclei, result in a greater energy release. The high energy neutrons continue to lose energy until they slow to thermal velocities, which at room temperature, have an average energy of 0.025 electron volts (eV). This decay process occurs over a few microseconds. Once the emitted neutrons have slowed to thermal energy levels, they diffuse in the formation and are eventually captured by the nuclei of other elements in the formation. This capture of the thermal neutrons results in the emission of high energy capture gamma rays by the formation atoms.

The type of detector used within the logging sonde is dependent on the data of interest. Where thermal neutrons are to be counted for a porosity determination, for instance, the detector may be a helium-3 proportional counter type. The theory and operation of $^3$He proportional counters is well known and is exemplified in U.S. Pat. Nos. 3,240,971 or 3,102,198; or in the article "Recent Improvements in Helium-3 Solid State Neutron Spectrometry" authored by T. Jeter and M. Kennison, IEEE Transactions on Nuclear Science, February 1967, vol. NS-14 No. 1, pp. 422-27 ("Jeter"); or the book "Radiation Detection and Measurement" by G. Knoll, pp. 533-34 (1979) ("Knoll"). Other types of counters, such as sodium-iodide scintillation detectors, may be utilized to detect not only high energy neutron decay but capture gamma ray emissions as well.

Helium-3 detectors are commonly used to detect thermal neutrons. However, their use raises a number of issues. First, the detector response within the tool must be calibrated, i.e., the detector response must be properly characterized such that the detected thermal neutron distribution is properly centered about the known thermal neutron distribution peak of 0.765 MeV. This process is sometimes referred to as gain stabilization.

Prior methods called for calibration of the detector in the field. This necessitated exposing the detector to a source of high energy neutrons, typically an isotopic source external to the sonde, to test detector response. This field procedure created a number of safety hazards. A field crew could be required to transport not only the source for the sonde, but a separate source strictly for the purpose of calibrating the sonde. In some instances, the sonde source was itself utilized for verification. It should be noted that safety concerns generally preclude the activation of a neutron accelerator at the surface for check source procedures, thereby necessitating a separate check source. As logging sonde design improved, it was no longer necessary to calibrate detectors at the well site since it could be performed at the logging company maintenance facility where specialized equipment could be utilized to reduce safety hazards.

Second, it is necessary to verify detector operation following transport to the well site. It will be appreciated that the transport of this specialized equipment to the job site could damage the detector or its related electronics. Because a $^3$He detector does not generally respond in the absence of a radiation source, a radiation source is required at the job site to verify that the detector is operating. Further, it is necessary to verify that the detector is responding to a source having a known energy distribution, characteristic peak and activity or count rate. It will be appreciated that the detector could fail, by way of open circuit or power failure, and that noise could be induced in the detector circuitry which could be mistaken for valid counts. Verification is achieved by measuring detector response to a source having a known energy peak and activity or count rate. The count rate is a function of the radioactivity level and may be readily determined by selection of the amount of source material.

One method of addressing this problem is disclosed in U.S. Pat. No. 5,180,197 to Wraight. Wraight teaches a self-calibrating/self-verifying $^3$He detector for use in the wireline and logging while drilling environments. Wraight teaches a $^3$He detector utilizing superatmospheric $^3$He gas having less than one part in $10^{10}$ tritium and, preferably, less than one part in $10^{11}$ tritium. Helium-3 detectors require this superpure $^3$He gas because the build up of beta particle emissions from tritium could conceivably create a noise which would become indistinguishable from the desired neutron counts. Wraight's $^3$He detector includes a self-calibrating feature which calls for the introduction of a low intensity source of alpha particles, such as a uranium or americium foil having a radioactivity level on the order of 10–30 nanocuries, in the body of the $^3$He detector. Most alpha particle energies occur in the range of 4 to 6 MeV, with a distribution peak of approximately 4.4 MeV, at the high end of the range of the desired thermal neutron distribution. Because the activity level of the alpha source can be readily controlled by proper selection of the amount of alpha source material, the low level alpha source provides a check source at a known energy and activity level well above the background noise which might be picked up by the detector. Further, because the low level alpha source is encased in the $^3$He detector, which itself is shielded by the sonde body, it is not necessary to utilize bulky source transport equipment when verifying the detector operation at the job site.

However, there still exist some problems with the self-calibrating $^3$He detectors disclosed by Wraight. First, the suggested alpha sources, uranium and americium, remain on the Nuclear Regulatory Commission (NRC) non-exempt list, i.e., there is no minimum amount or radioactivity level for these isotopes which is exempt from safety licensing standards. See, 10 C.F.R. §§30.11-.20, 30.70 Schedules A and B. Should the sonde become stuck and unretrievable in a borehole, it would be necessary to take remedial safety measures to seal the sonde, even if the primary isotopic neutron source is retrieved from the sonde.

Second, counts attributable to the alpha source could affect the observed distribution of thermal neutrons. While efforts may be made to correct any distribution skew arising from the alpha source, it would still be difficult to determine at what level the thermal neutron count on the high end of the energy spectrum is being affected by the alpha source.

Third, the detector response to the alpha source must be determined and subtracted from the total detector counting rate to determine the count rate attributable to thermal neutrons. The counts from the alpha source introduce a statistical uncertainty in the thermal neutron count rate when the two count rates are similar.

Thus, there remains a need for a self-verifying, self-calibrating $^3$He detector which does not utilize a non-exempt radiation source and does not adversely affect the distribution of the thermal neutron count.

SUMMARY OF THE PRESENT INVENTION

The present invention is directed to a self-verifying, self-calibrating $^3$He detector for use in nuclear logging which utilizes a low level beta source to verify and calibrate the detector. The beta source is selected such that its energy spectrum is above the background noise energy level, while still remaining below the expected distribution for thermal neutrons. As with the alpha source disclosed in Wraight, the activity level of the beta source may be selected to present a known count rate in a known energy spectrum for the purposes of verification and calibration.

The beta source may be selected such that its energy spectrum falls between the drop off of the background noise and the beginning of the thermal neutron energy spectrum. This permits the establishment of three thresholds: the first threshold occurring after the background energy noise level drop off, the second at the known characteristic energy distribution peak for the beta source, and the third at the known energy endpoint for the beta source which, preferably, occurs prior to the energy spectrum attributable to the thermal neutrons. This third threshold may also be used to exclude background noise and beta source counts from the overall counts and thereby eliminate any statistical uncertainty attributable to the beta source.

The preferred embodiment also utilizes two energy windows of a predetermined bandwidth, the energy windows being centered about the second threshold, i.e., the beta source characteristic energy distribution peak. Counts are made for a predetermined time for the energy windows. These window counts are used to create an error signal which is introduced through a negative feed back loop to achieve and maintain gain stabilization about the expected characteristic energy distribution peak for the selected beta source.

Further, the present invention utilizes a beta source having a radioactivity level and amount which makes it exempt from NRC licensing controls. Thus, if a logging sonde utilizing the detectors of this present invention should become stuck in the borehole and be unretrievable, it would not be necessary to take remedial measures to seal the sonde.

BRIEF DESCRIPTION OF THE DRAWINGS

A clearer understanding of the present invention may be obtained from the following discussion of the preferred embodiment of the present invention with reference to the attached drawings in which.

DETAILED DESCRIPTION OF THE PREFERRED EMBODIMENT

The preferred embodiment of the present invention is utilized within the field of nuclear logging operations. While the discussion of the preferred embodiment is in the context of wireline logging operations, it will be appreciated that the same apparatus and method used herein may be readily applied to measurement while drilling (MWD) and logging while drilling (LWD) techniques.

Figure 1:
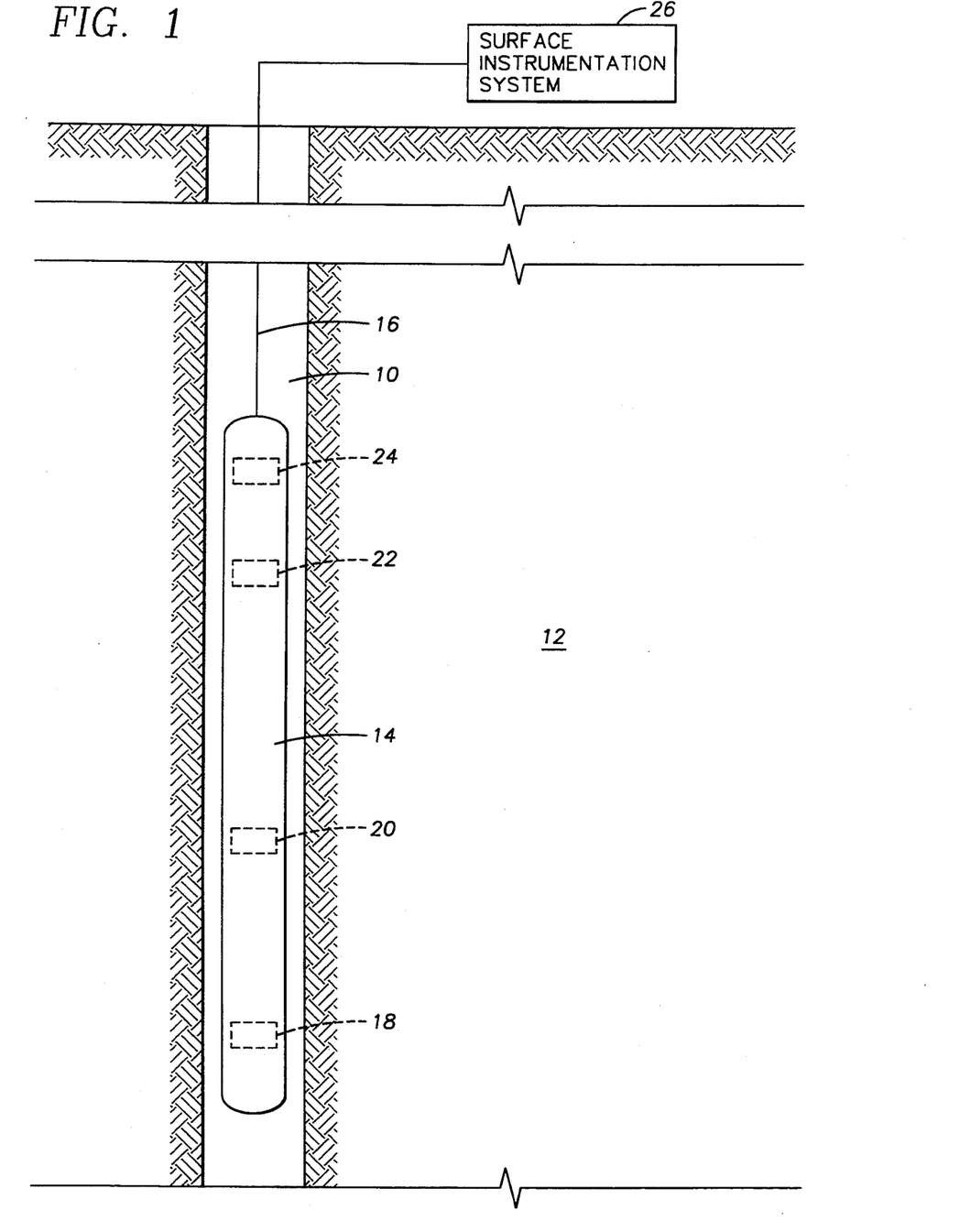
FIG. 1 is a simplified schematic representation of a nuclear wireline logging sonde in use.

FIG. 1 is a simplified schematic of wireline nuclear logging operations. In FIG. 1, a borehole 10 has been drilled into an earth formation 12. A nuclear logging sonde 14 is lowered on an armored, multiconductor cable 16 into the borehole 10 to a desired depth of investigation. It will be appreciated that many elements associated with wireline logging, such as a winch system, winch control, depth system, logging platform and other elements have been eliminated from FIG. 1 for the purpose of simplicity, as such elements are not required to obtain an understanding of the present invention. It will further be appreciated that while sonde 14 is depicted as a single tool in the borehole 10, the sonde 14 may often be part of a logging string which may include other specialized logging instrumentation.

The sonde 14 illustrated in FIG. 1 is a conventional Dual Spaced Nuclear Tool (DSNT-II) having a nuclear source 18, a near detector 20 and a far detector 22. The sonde 14 detectors 20 and 22 are conventionally described as the near and far detectors, respectively, relative to their position from the nuclear source 18. The sonde 14 nuclear source 18 may be an isotopic neutron source, which generates fast neutrons as a result of radioactive decay or a neutron generator. In a typical neutron generator, deuterium ions are accelerated by an externally induced potential to strike a deuterium or tritium target to yield an isotope of helium, fast neutrons and fixed energy difference. These fast neutrons have a characteristic energy peak of approximately 3 MeV where the target is deuterium and 14 MeV where the target is tritium. These reactions are described in further detail in Knoll, pp. 36–37 and typical nuclear generators are further described in U.S. Pat. No. 3,546,512. In the exemplary logging sonde 14 of FIG. 1, the neutron source is an 18 curie americium-beryllium isotopic source. It will be appreciated that other isotopic sources and nuclear accelerators capable of producing fast neutrons may be used in conjunction with the preferred embodiment. To make a measurement, the operator of the logging equipment will issue a command from the surface instrumentation system 26 to the sonde 14 to unmask or activate the nuclear source 18 and irradiate the formation 12 with fast neutrons. It will be appreciated that the specific nuclear logging techniques will differ as to what is being measured. For example, a nuclear logging sonde may measure epithermal neutrons or capture gamma rays. In the exemplary sonde 14 of FIG. 1, the DSNT tool is designed to count thermal neutrons. As described above, the fast neutrons undergo collisions with the nuclei of atoms naturally occurring in the formation until they reach thermal speeds. These thermal neutrons are then counted by the near 20 and far 22 detectors on sonde 14.

Figure 2:
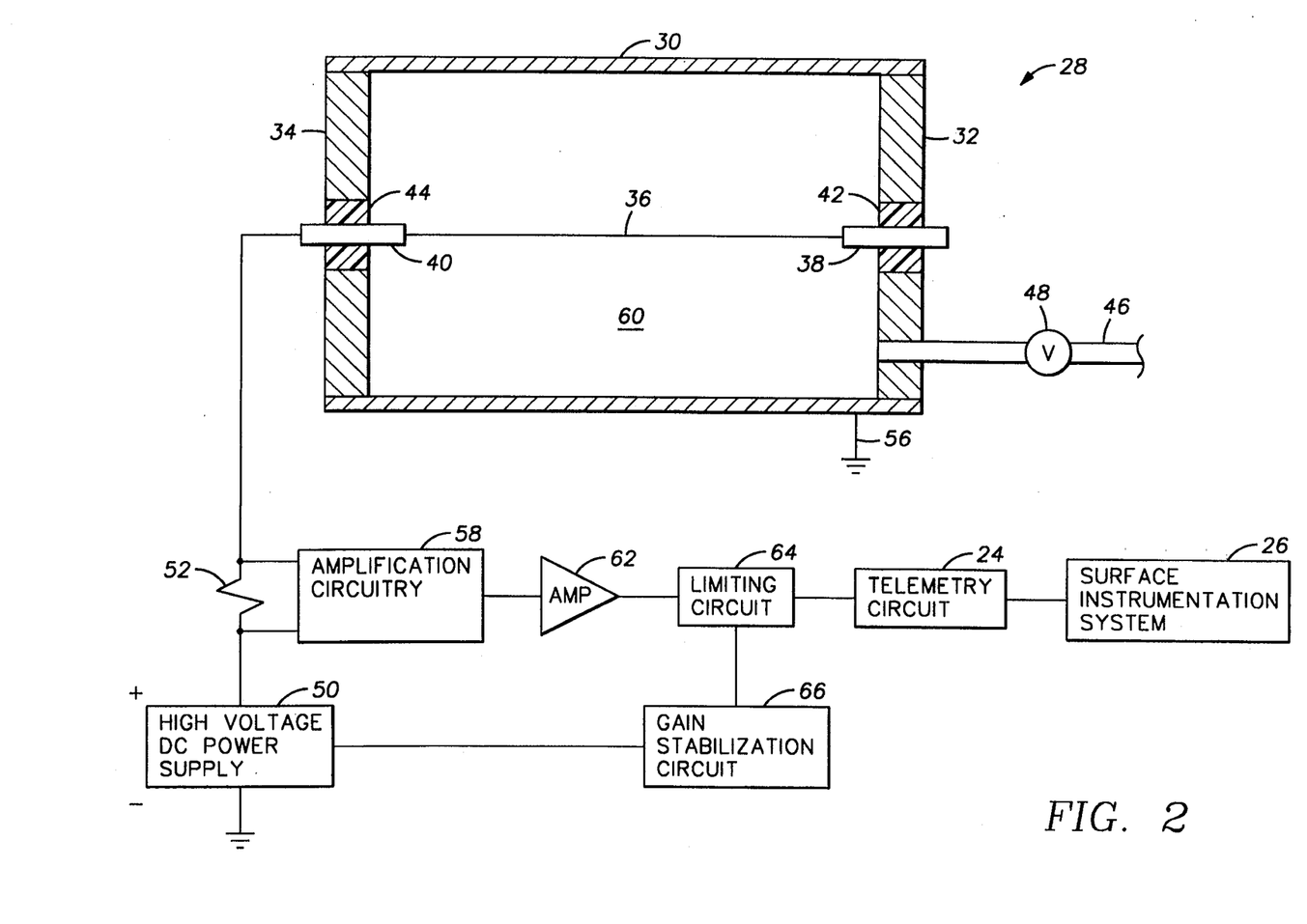
FIG. 2 is a cross-sectional representation of an exemplary typical helium-3 proportional counter detector of this present invention along with a block diagram of detection circuitry, telemetry and surface electronics.

The detectors utilized in the DSNT tool of FIG. 1 are of the helium-3 proportional counter type. Typical designs of helium-3 proportional counters are described in detail in U.S. Pat. Nos. 3,240,971 or 3,102,198, which are incorporated by reference, and in the Jeter or Knoll references. The detectors 20 and 22 respond to the reaction of atomic particles with the detector gas with a resulting change in electrical potential on electrode 36 (FIG. 2). These changes in potential across an energy spectrum are measured and processed by the detector electronics (not shown in FIG. 1) and output to the tool telemetry electronics 24, where it is further processed and transmitted via cable 16 to the surface instrumentation system 26. The $^3$He counter and the associated circuitry of the preferred embodiment are set forth in greater detail in FIG. 2.

Figure 5:
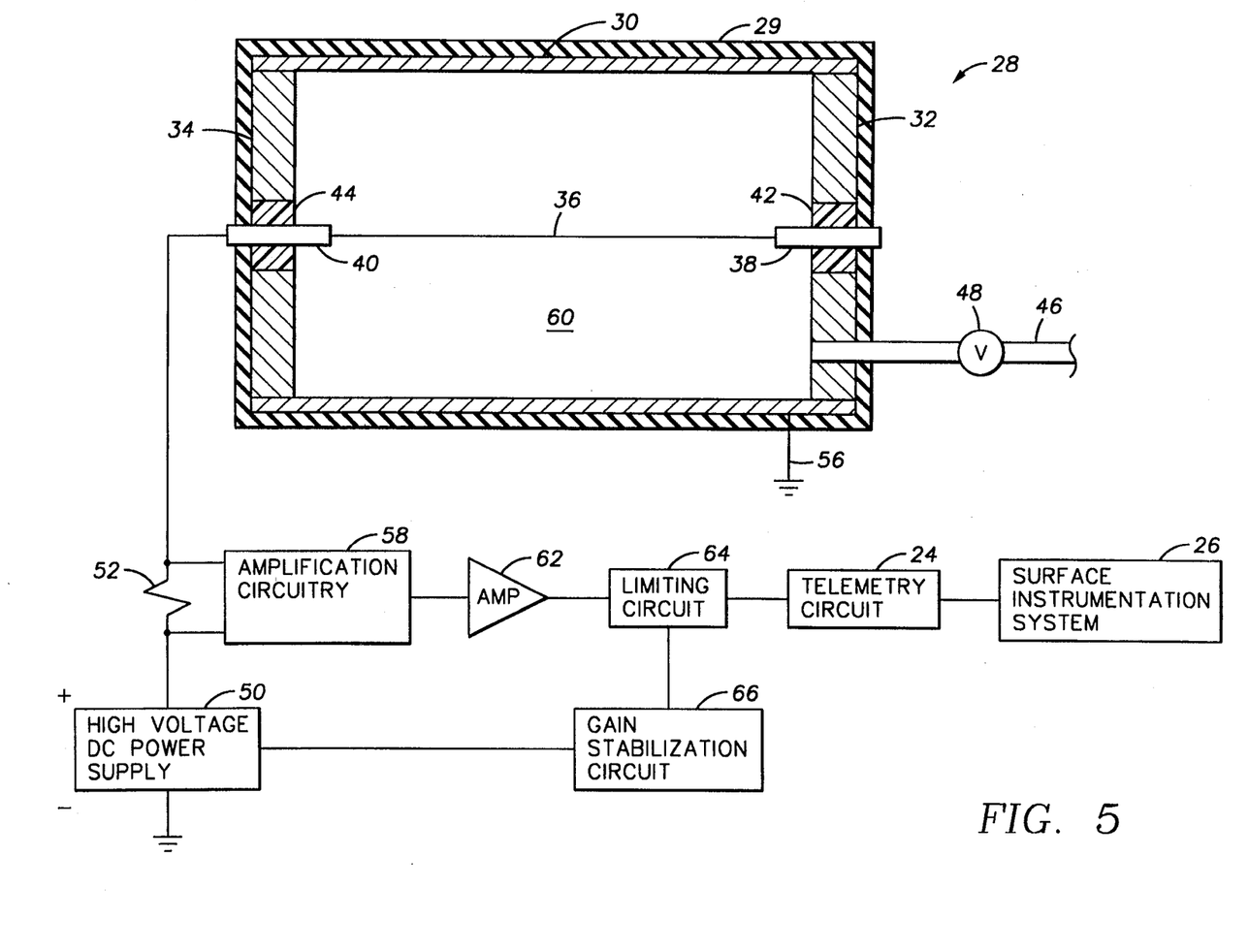
FIG. 5 is a cross-sectional representation of an exemplary helium-3 detector of the present invention having a shield thereabout to eliminate thermal neutron flux.

A simplified cross-sectional view of an exemplary $^3$He proportional counter and its associated circuitry is depicted in FIG. 2. The detector 28 is comprised of a cylindrical pressure housing 30 transparent to thermal and epithermal neutron flux, having pressure tight ends 32 and 34, which are likewise transparent to thermal and epithermal neutron flux, secured thereon. This forms a pressure tight volume within the interior of the detector 28. A metal electrode 36 is disposed along the cylindrical axis of detector 28 and is supported at each end by connecting rods 38 and 40. The connecting rods 38 and 40 are secured in, but insulated from, the detector 28 walls 30 and ends 32 and 34 by means of insulating plugs 42 and 44. The insulating plugs 42 and 44 may be composed of quartz, ceramic or some other suitable dielectric material. A gas pressurization tube 46 is connected to detector 28 through a pressure valve 48 and is in fluid communication with the interior of detector 28 through end 32. The detector 28 is pressurized with $^3$He gas through tube 46 and valve 48 to the desired pressure levels and the valve 48 is closed to seal the $^3$He within the detector 28. It will be appreciated that where the detector 28 is intended to measure solely epithermal neutron flux, the detector 28 may be covered with a metal shield 29 (FIG. 5), such as cadmium, to eliminate the thermal neutron flux.

Electrode 36 is in electrical communication with a high voltage external DC power source 50 through resistor 52, with the other electrode of the power source 50 being tied to ground 54. The housing 30 of detector 28 is likewise tied to ground 56. The preferred embodiment of the present invention further includes a pure beta-minus source 60 located in the interior of the detector 28. The beta-minus source 60 may be in a gaseous or solid form based on the particular isotopic source selected. The particular nature of the beta-minus source 60 and its operation within the preferred embodiment will be discussed in greater detail below.

Typically, a thermal neutron reaction within a $^3$He proportional counter of the type depicted in FIG. 2, will deposit approximately 765 KeV (0.765 MeV), causing a distribution peak at this level in the energy spectrum as a result of the kinetic energy released by proton and triton reaction products. The beginning point for the thermal neutron distribution in $^3$He counters is typically detected at about 0.5 MeV. The energy deposited by the thermal neutrons creates a change in voltage on electrode 36, which is measured by amplification circuitry 58 across resistor 52. The output from amplification circuitry 58 is fed to a second amplifier 62. The output from amplifier 62 is input into a limiting circuit 64. The limiting circuit 64 is used to define the three threshold energy levels and two energy windows utilized within the preferred embodiment. The thresholds and windows are utilized to eliminate counts attributable to background noise or the beta source and to form an error signal for the purposes of gain stabilization, as will be described further below. The limiting circuit 64 outputs the thermal neutron counts to telemetry circuitry 24, which transmits the count data to the surface instrumentation system 26 via armored cable 16, where it is then processed as part of the logging information. The limiting circuit 64 also outputs the error signal to the gain stabilization circuitry 66, which is essentially a negative feedback loop. The gain stabilization circuitry 66, in turn, controls the voltage output for power supply 50. Thus, the error signal may be used to stabilize detector 28 response to the beta-minus source 60 about the known energy characterization peak for the beta-minus source 60. The manner in which amplifier 62, limiting circuitry 64 and gain stabilization circuitry 66 are utilized to achieve gain stabilization is discussed further below and in U.S. Pat. No. 3,976,878, which is hereby incorporated by reference.

The exemplary construction of detector 28 and its associated circuitry is incorporated within both the near and far detectors 20 and 22 of FIG. 1. The use of two detectors in nuclear tools is common and results in the desired measurements being less dependent on lithology and borehole-size effects. The specifics of neutron measurement and its interpretation are outside of the scope of the present invention and will not be discussed herein.

As noted above, Wraight teaches the introduction of an alpha source into the detector 28 of FIG. 2 for the purposes of detector operation verification and gain stabilization. The alpha source taught was an isotope of americium or uranium. The alpha particles emitted have a characterization peak of approximately 4.4 MeV. Wraight also teaches that the amount of alpha source may be selected such that a predetermined count rate distribution from the alpha source may be measured for the purposes of verification and gain stabilization. The energy spectrum observed by a detector 28 utilizing the alpha source taught by Wraight is depicted in prior art FIG. 3.

Figure 3:
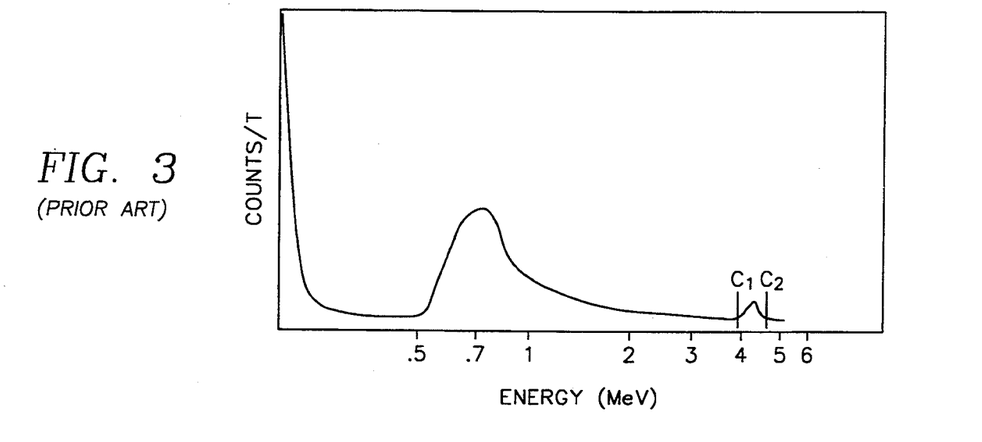
FIG. 3 is graphical representation of an energy spectrum observed by a prior art helium-3 detector utilizing an incorporated alpha source.

The energy spectrum/count rate depicted in FIG. 3 shows a background noise level dropping off to a base count level prior to the increasing counts attributable to thermal neutrons, which peaks at approximately .765 MeV. The count rate continues to decrease until it detects the alpha source having a characterization peak of 4.2 MeV. The existence of this peak verifies that the detectors 20 and 22 are operational. Further, two count rates, $C_1$ and $C_2$ are measured on each side of alpha source peak for the purposes of gain stabilization according to the method described in U.S. Pat. No. 3,976,878. Alternatively, gain stabilization may be accomplished according to the method described in Knoll, pp. 730-32. However, the use of americium or uranium as an alpha source, as taught by Wraight, carries with it the additional problem that there is no acceptable quantity of either material on the exempt list. Thus, they are subject to stricter NRC licensing controls.

The preferred embodiment of the present invention utilizes a beta-minus source 60 instead of an alpha source. The beta-minus source 60 may be selected from a group of isotopes having a sufficiently long half-life to minimize the amount of servicing required for detectors 20 and 22. Moreover, the beta-minus source should be selected such that its energy characterization peak is above background noise level but sufficiently below the beginning of the energy spectrum for thermal neutrons, approximately 0.5 MeV. Lastly, the beta-minus source should be selected from those isotopes for which there exist exempt quantities per NRC regulations. A nonexclusive list of beta-minus sources, along with their respective energy characterization end point and half-life is set forth in Table 1 below:

TABLE 1

| Nuclide | Half-Life | Endpoint Energy (MeV) |
|---|---|---|
| Tritium ($^3$H) | 12.26 y | 0.0186 |
| Carbon ($^{14}$C) | 5730 y | 0.156 |
| Chlorine ($^{36}$Cl) | 3.08 * $10^5$ y | 0.714 |
| Nickel ($^{63}$Ni) | 100 y | 0.067 |
| Strontium ($^{90}$Sr) | 27.7 y | 0.546 |
| Technetium ($^{99}$Tc) | 2.12 * $10^5$ y | 0.292 |

It will be appreciated that the isotopes set forth in Table 1 are exemplary and that other beta-minus emitting sources may be utilized within the preferred embodiment of the present invention. Moreover, while each of the above isotopes is described in terms of its endpoint energy level, the peak characterization for each may be readily determined by one of ordinary skill in the art. However, problems may arise with the use of some of the isotopes in the preferred embodiment. Tritium has a relatively low energy characterization peak and it may be difficult to distinguish the tritium peak from the background noise for the purposes of verification and gain stabilization. Chlorine-36 may also prove difficult to utilize within the preferred embodiment, since its end point energy approaches the expected distribution for thermal neutrons. Accordingly, the preferred embodiment of the present invention utilizes a beta-minus source having an energy characterization peak unaffected by the noise level and below the expected energy distribution for thermal neutrons. The sources best suited to utilization within the preferred embodiment include carbon-14, nickel-63, strontium-90 and technetium-99. Federal regulations, 10 C.F.R. §30.70 Schedules A and B, require that for strontium-90 to be utilized as an exempt source that it be limited to a radioactivity level of 0.1 microcuries, the lowest radioactivity level of all of the above suggested beta sources.

It will be appreciated that a lower radioactivity level may be utilized for all of the recommended beta sources to achieve a known count rate, such as ten counts per second. Accordingly, a beta-minus source having a radioactivity level of 0.1 microcuries or less (100 nanocuries) may be utilized within the preferred embodiment.

Figure 4A:
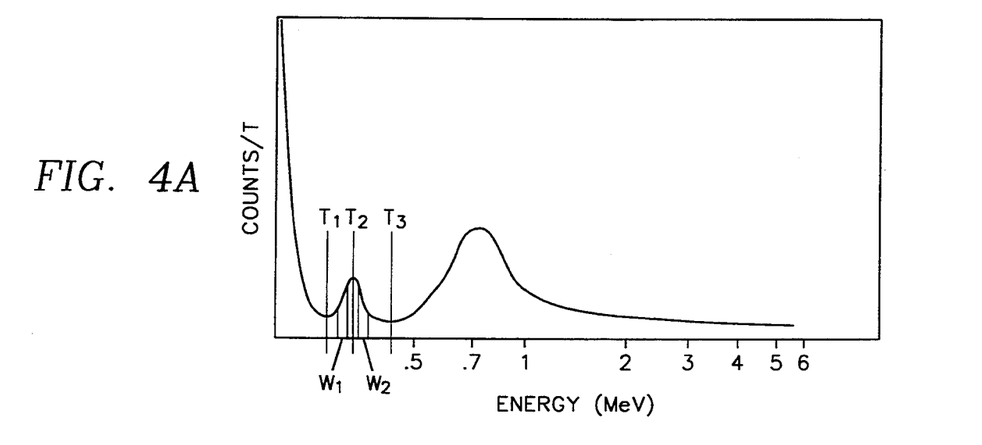
FIGS. 4A and 4B are graphical representations of an energy spectrum observed by an exemplary helium-3 detector of the present invention.
Figure 4B:
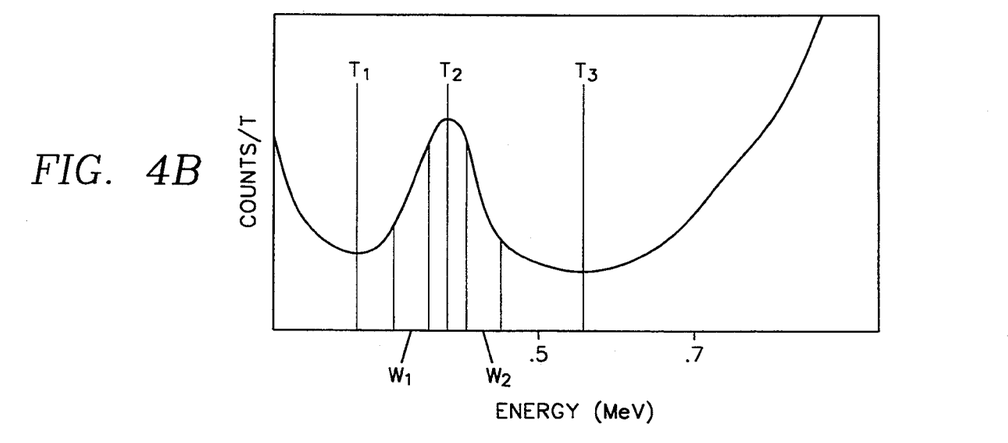

FIG. 4A is a graphic representation of a distribution of observed energies and related count rates in a sonde 14 of FIG. 1 utilizing the detector 28 and circuitry exemplified in FIG. 2. A count peak in the range of less than 0.5 MeV is shown, followed by the energy peak characteristic of thermal neutrons at 0.765 MeV. Associated with this first energy peak are three thresholds, $T_1$, $T_2$ and $T_3$, and two energy windows, $W_1$ and $W_2$. The beta particles emitted by the beta-minus source 60 create the first energy peak and verify the operation of the $^3$He detectors. The limiting circuitry 64 measures two count rates in two energy windows, $W_1$ and $W_2$, of a predetermined width on either side of the beta energy peak threshold $T_2$. It will be appreciated that the bandwidth of the energy windows $W_1$ and $W_2$, as well as the location of thresholds $T_2$ and $T_3$, will vary with energy distribution and characteristic peak for the specific beta-minus source in use. The relation of the three threshold levels and two windows to the background noise and thermal neutron distribution is further depicted in FIG. 4B, which expands a portion of FIG. 4A. The count rate is initially high at very low energy levels, attributable to background noise. The first threshold $T_1$ is defined in the limiting circuit 64 as the cut-off point for the background noise. The second threshold $T_2$ is defined within limiting circuit 64 as the expected energy characterization peak for the selected beta source. The third threshold $T_3$ defined in limiting circuit 64 represents the energy endpoint distribution for the selected beta source. It will be appreciated that the energy characterization peaks $T_2$ and endpoint $T_3$ for various beta sources may be readily determined by one of ordinary skill in the art. All counts at energy levels below threshold $T_3$ are attributable to either background noise or the beta minus source 60. The limiting circuit 64 outputs count rates above threshold $T_3$ to the telemetry circuitry 24, thereby eliminating noise and beta source counts. Thus, the preferred embodiment avoids the problems of introducing distribution skew and statistical uncertainty attributable to alpha source counts in Wraight.

Two energy windows $W_1$ and $W_2$ are also defined within limiting circuit 64. The energy windows $W_1$ and $W_2$ are of an equal, predetermined bandwidth and are centered and offset a predetermined energy amount from threshold $T_2$. It will be appreciated that the window's $W_1$ and $W_2$ bandwidth, as well as their positioning in the energy spectrum will be dependent upon the energy distribution for the selected beta source. The number of counts for windows $W_1$ and $W_2$ for a predetermined time period should be statistically equivalent due to the energy distribution for the beta source. The count period for windows $W_1$ and $W_2$ will be a function of the radioactivity level of the beta source, which itself is determined by the amount of source material selected. The number of counts for windows $W_1$ and $W_2$ for a predetermined period of time is compared by limiting circuit 64, which forms an error signal as a function of the difference in counts. According to U.S. Pat. No. 3,976,878, an error signal, which is a function of the difference in the counts ($W_1$–$W_2$), may be used to control a circuit parameter. In FIG. 2, the error signal is fed to gain stabilization circuitry 66, which in turn controls the output from the high voltage power supply 50. The voltage on electrode 36 is varied as a function of the error signal provided gain stabilization circuitry 66 such that the counts for windows $W_1$ and $W_2$ are statistically equivalent, thereby centering the detector response 28 to the beta source 60. As a result, the detector response to thermal neutron flux is also centered about its characteristic energy peak of 0.765 MeV. This technique is further discussed in the '878 patent. Alternatively, the counts may be compared with a known reference source as described in Knoll, pp. 730–32. Further, desired number of counts for the beta-minus source may be readily selected by properly selecting the amount of beta-source material within NRC exempt guidelines.

Thus, the preferred embodiment of the present invention provides a means for self verification and gain stabilization for a $^3$He detector utilizing NRC exempt isotopes. An additional advantage is the fact that the energy spectrum for the beta-minus source is well below the expected distribution for thermal neutrons. The measured distribution of thermal neutrons in the preferred embodiment, those counts above $T_3$, is not affected by the spike in the high energy range characteristic of the alpha calibration sources claimed in Wraight.

The above disclosure and discussion of the preferred is explanatory and exemplary of the present invention. It will be appreciated that changes may be made on construction or selection of the detector, detector gas, circuitry, beta-minus source or establishment of the various energy thresholds or windows may be made without departing from the spirit of the claimed invention.

I claim:

1. A proportional counter radiation detector, comprised of a cylindrical pressure-tight housing, the housing being transparent to thermal and epithermal neutron flux, the detector having an electrode extending axially through the detector housing and insulated from the detector housing, the electrode adapted to be connected to an external high voltage direct current power source, the detector housing further including a detector gas disposed therein, the detector gas composed primarily of helium-3 having less than one part in $10^{10}$ parts tritium, the detector further including a source of radioactivity within the detector housing, the source of radioactivity having an energy spectrum endpoint of less than 0.5 MeV.

2. The radiation detector of claim 1, wherein the source of radioactivity generates a radiation count rate of about ten counts per second.

3. The radiation detector of claim 1, wherein the source of radioactivity is a beta-minus particle source.

4. The radiation detector of claim 1, wherein the source of radioactivity has a radioactivity level of 100 nanocuries or less.

5. The radiation detector of claims 1 or 3, wherein the source of radioactivity is an isotope of carbon.

6. The radiation detector of claims 1 or 3, wherein the source of radioactivity is an isotope of nickel.

7. The radiation detector of claims 1 or 3, wherein the source of radioactivity is an isotope of strontium.

8. The radiation detector of claims 1 or 3, wherein the source of radioactivity is an isotope of technetium.

9. The radiation detector of claims 1 or 3, wherein said detector further includes a shield surrounding the detector cylindrical housing, the shield being impervious to thermal neutron flux and transparent to epithermal neutron flux.

10. A proportional counter radiation detector, the detector comprised of a pressure-tight housing transparent to thermal and epithermal neutron flux, the detector having an electrode disposed therein, the electrode being insulated from the housing and adapted to be connected to an external potential source, the detector further including a pressurized detector gas disposed therein, the detector gas being comprised primarily of helium-3 having less than one part to $10^{10}$ parts tritium, the detector further including a source of beta-minus particles within the detector housing, the source of beta-minus particles having a characteristic energy spectrum peak below 0.5 MeV and a radioactivity level of 100 nanocuries or less.

11. The radiation detector of claim 10, wherein the source of beta-minus particles is an isotope of carbon.

12. The radiation detector of claim 10, wherein the source of beta-minus particles is an isotope of nickel.

13. The radiation detector of claim 10, wherein the source of beta-minus particles is an isotope of strontium.

14. The radiation detector of claim 10, wherein the source of beta-minus particles is an isotope of technetium.

15. The radiation detector of claim 10, wherein said detector further includes a shield surrounding the detector housing, the shield being impervious to thermal neutron flux and transparent to epithermal neutron flux.

16. An apparatus for nuclear logging a formation, comprising:

a nuclear logging assembly, the assembly comprising a source of high energy neutrons;

a radiation detection system, the radiation detection system being in spaced relation to the source of high energy neutrons and including a proportional counter radiation detector, the detector comprised of a sealed, high-pressure housing transparent to thermal and epithermal neutron flux, the detector further having an electrode disposed therein, the electrode being insulated from the detector housing and adapted to be connected to an external source of electrical potential, the detector further including a detector gas disposed within the housing, the detector gas composed primarily of helium-3 having less than one part in $10^{10}$ parts tritium, the detector further including a source of beta-minus particles therein, the source having a characteristic energy peak of less than 0.5 MeV and a predetermined radioactivity level of 100 nanocuries or less, and an amplification means for counting changes in electrical potential in the electrode induced by the reaction of atomic particles with the detector gas across a predetermined energy spectrum;

means for verifying the operation of the detector;

means for stabilizing the gain of the amplification means;

means for positioning the nuclear logging assembly in an earth formation at a desired depth of investigation;

means for transmitting the detector counts to surface equipment, the surface equipment including means for recording the number of counts in relation to the depth of investigation.

17. The apparatus of claim 16, wherein the means for verifying radiation detector operation includes the detector counting beta-minus source particle emission at the characteristic energy peak and predetermined radioactivity level.

18. The apparatus of claim 16, wherein the means for stabilizing the gain of the amplification means comprises:
means for defining two energy windows of a predetermined bandwidth, the first energy window being offset a predetermined energy difference above the characteristic energy peak, the second energy window being offset the same energy difference below the characteristic energy peak;
means for recording counts for the first and second energy windows for a predetermined time period;
means for comparing the number of counts for the first and second energy windows;
means for generating an error signal as a function of the difference in counts between the first and second energy windows;
means for varying the electrical potential on the electrode in response to the error signal to adjust the detector response to the beta-minus source to coincide with the beta-minus source's characteristic energy peak.

19. The apparatus of claim 16, further comprising:
means for defining an energy threshold, the energy threshold coinciding with the energy spectrum endpoint for the beta-minus source; and
means for eliminating all counts below the energy threshold.

20. A method for verifying the operation of a proportional counter radiation detector, the detector being comprised of a sealed, high-pressure housing transparent to thermal and epithermal neutron flux, the detector further having an electrode disposed therein, the electrode being insulated from the detector housing and adapted to be connected to an external source of electrical potential, the detector further including a detector gas disposed within the housing, the detector gas composed primarily of helium-3 having less than one part in $10^{10}$ parts tritium, the detector further including amplification circuitry for counting changes in the electrical potential in the electrode induced by reaction of atomic particles with the detector gas across a predetermined energy spectrum, the steps including:
introducing a beta-minus particle source into the detector housing, the betaminus source having an energy spectrum distribution with a characteristic energy peak of less than 0.5 MeV and a predetermined radioactivity level of 100 nanocuries or less;
counting the beta particle emissions from the beta-minus source across its energy spectrum; and
comparing the beta particle emission count at the known beta-minus source characteristic energy peak with the predetermined radioactivity level.

21. The method of claim 20, further including a method for calibrating the detector gain, comprising the steps of:
(a) defining two energy windows of predetermined bandwidth, the first energy window being offset a predetermined energy difference above the characteristic energy peak and the second energy window being offset the same energy difference below the characteristic energy peak;
(b) counting the number of beta particle emissions in each of the energy windows for a predetermined period of time;
(c) generating an error signal as a function of the difference between the number of counts in the first and second energy windows;
(d) varying the electrical potential on the electrode in response to the error signal;
(e) repeating steps (b)–(d) until the number of counts in the first and second energy windows are statistically equivalent, thereby stabilizing the detector response to the beta-minus source at its characteristic peak.

* * * * *